G. W. HARRISON.
Improvement in Harvester-Pitman.
No. 5,068. Reissued Sep. 24, 1872.
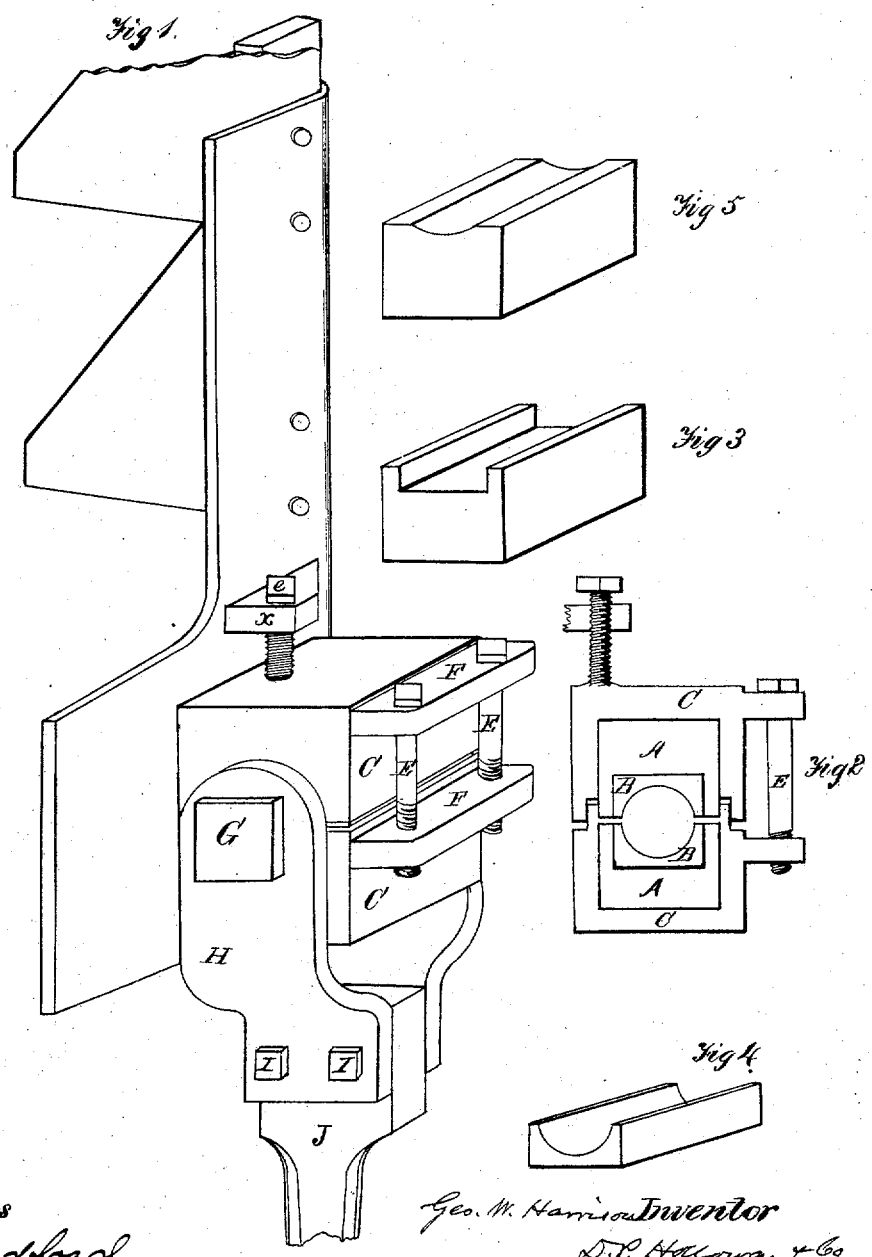
Witnesses
N. Bradford
A. Edwards Bils
Geo. W. Harrison Inventor
D. P. Holloway & Co
Attys
AM. PHOTO-LITHOGRAPHIC CO. N.Y. (OSBORNE'S PROCESS.)

UNITED STATES PATENT OFFICE.

GEORGE W. HARRISON, OF LANSING, MICHIGAN, ASSIGNOR, BY MESNE ASSIGNMENTS, TO HIMSELF, SEYMOUR FOSTER, AND SCHUYLER S. OLDS.

IMPROVEMENT IN HARVESTER-PITMEN.

Specification forming part of Letters Patent No. 119,356, dated September 26, 1871; reissue No. 5,068, dated September 24, 1872.

*To all whom it may concern:*

Be it known that I, GEORGE W. HARRISON, of Lansing, in the county of Ingham and State of Michigan, have invented a new and Improved Adjustable Rubber-Faced Box for Pitman-Connection, which is designed to be used principally in mowing and reaping machines for connecting the pitman to the knife-head; and I do hereby declare that the following is a full, clear, and exact description of the construction and operation of the same, reference being had to the annexed drawing making a part of this specification, and to the letters of reference marked thereon.

Figure 1 is a perspective view of a box or case for containing my improved boxes and for connecting them to the head of the knife, the boxes being shown in position. Fig. 2 is a sectional view of the same, showing also the construction of the boxes and the screws for adjusting them. Fig. 3 is a perspective view of the elastic facing, it being of the form shown. Fig. 4 shows the form of one-half of a metal box, which may be used with the elastic facing. Fig. 5 represents one-half of a rubber box, which may be used without the metallic box or lining.

This invention relates to a vulcanized-rubber or an equivalent facing or bearing for pitmen-boxes for reaping and mowing machines, it being also applicable to pitmen of other machines; and it consists in a vulcanized-rubber or other equivalent facing or box for such purposes, which box may be made entirely of rubber or its equivalent, or it may have a lining of metal, as shown.

A A in the drawing represent the rubber or other equivalent facings or boxes, which, when metal linings are to be used, have projecting flanges, as shown in Fig. 3, for the purpose of covering the sides of the metal and preventing the angles of the rod as it is moved by the crank from forcing said metal boxes against the sides of the casing, and thus wearing it away at that point. These boxes may be made entirely of vulcanized rubber or of other suitably-elastic material, which, at the same time, preserves the requisite degree of solidity to enable them to withstand the thrust put upon them by the crank of the machine; but I prefer for most purposes to make them as shown in Fig. 2, where they are represented as being lined with metallic pieces B B, which metallic pieces have in their centers cavities for the reception of the crank-pin of the pitman. These metallic linings fit into recesses in the elastic facings or bearings and afford all of the advantages of a metal bearing, while by the elastic facings they are prevented from coming in contact with the case of metal which incloses them, at the same time that said facings prevent the sudden jar upon the machine which is usual when the crank which drives or gives motion to the cutter changes the direction in which said cutter is moving. C C refer to the parts of the iron case which inclose the boxes above referred to, one of which, when used in connection with a harvester, it is preferable to cast as a part of the knife-head, and to provide it with a shank, K, for attaching it to the knife M, as shown in Fig. 1. E E represent bolts for securing the parts in position and for compressing or adjusting the boxes around the bolt G, which passes through them or around the crank-pin when one is used. These bolts pass through flanges F F, which project from the parts C C of the case which inclose the boxes. Upon the shank of the knife-head there is formed a lug, X, through which a bolt, *e*, passes, which aids in adjusting the pressure upon the boxes C C. H refers to the pitman-head, which, in this case, has two ears, (one upon each side of the boxes C C,) their outer ends being joined to the pitman J by means of bolts I I; said head being connected to the boxes by the bolt G, as above described.

Having thus described my invention, what I claim, and desire to secure by Letters Patent, is—

1. A box for the journal or crank-pin of a connecting-rod to rest in, composed of vulcanized rubber or other equivalent material, or of such material lined with metal, as described, when such boxes are inclosed in a metallic case and have a recess formed in them for the reception of the metallic portion or for the crank-pin of the pitman, substantially as and for the purpose specified.

2. The combination of a journal-box constructed as above described with the knife-head of a harvesting-machine, substantially as and for the purpose set forth.

3. The coupling for harvesters, consisting of the inner movable box C, the outer box C attached to the knife-head, the lug X, set-screw *e*, bolt G, and rubber blocks A A, with or without the metallic linings B B, substantially as specified.

In testimony whereof I have signed my name to the foregoing specification in the presence of two subscribing witnesses.

G. W. HARRISON.

Witnesses:
FRANK WELLS,
C. CLOWES.